United States Patent
Ash et al.

(10) Patent No.: US 10,152,423 B2
(45) Date of Patent: Dec. 11, 2018

(54) SELECTIVE POPULATION OF SECONDARY CACHE EMPLOYING HEAT METRICS

(75) Inventors: Kevin J. Ash, Tucson, AZ (US); Michael T. Benhase, Tucson, AZ (US); Stephen L. Blinick, Tucson, AZ (US); Evangelos S. Eleftheriou, Rueschlikon (CH); Lokesh M. Gupta, Tucson, AZ (US); Robert Haas, Adliswil (CH); Xiao-Yu Hu, Horgen (CH); Ioannis Koltsidas, Zurich (CH); Roman A. Pletka, Uster (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 937 days.

(21) Appl. No.: 13/285,817

(22) Filed: Oct. 31, 2011

(65) Prior Publication Data
US 2013/0111146 A1    May 2, 2013

(51) Int. Cl.
| | |
|---|---|
| *G06F 12/0871* | (2016.01) |
| *G06F 12/0888* | (2016.01) |
| *G06F 12/0897* | (2016.01) |
| *G06F 12/128* | (2016.01) |
| *G06F 12/121* | (2016.01) |

(52) U.S. Cl.
CPC ...... *G06F 12/0888* (2013.01); *G06F 12/0871* (2013.01); *G06F 12/0897* (2013.01); *G06F 12/121* (2013.01); *G06F 12/128* (2013.01)

(58) Field of Classification Search
CPC ............. G06F 12/0811; G06F 12/0888; G06F 12/0897

USPC ................................................ 711/122, 138
See application file for complete search history.

(56) References Cited

U.S. PATENT DOCUMENTS

| | | | | |
|---|---|---|---|---|
| 6,507,893 | B2 * | 1/2003 | Dawkins et al. | 711/133 |
| 7,711,905 | B2 | 5/2010 | Flemming et al. | |
| 8,099,554 | B1 * | 1/2012 | Solomon et al. | 711/118 |
| 8,255,624 | B2 * | 8/2012 | Fujii et al. | 711/113 |
| 8,443,150 | B1 * | 5/2013 | de la Iglesia | 711/135 |
| 8,972,661 | B2 * | 3/2015 | Benhase et al. | 711/122 |
| 8,972,662 | B2 * | 3/2015 | Benhase et al. | 711/122 |
| 9,003,128 | B2 * | 4/2015 | Nomura et al. | 711/136 |
| 2004/0139282 | A1 * | 7/2004 | Yoshioka et al. | 711/133 |
| 2007/0067575 | A1 | 3/2007 | Morris et al. | |
| 2008/0059707 | A1 * | 3/2008 | Makineni et al. | 711/122 |

(Continued)

OTHER PUBLICATIONS

Johnson et al. "Run-time Adaptive Cache Hierarchy Management via Reference Analysis." Jun. 1997. ACM. ISCA '97. pp. 315-326.*

(Continued)

*Primary Examiner* — Nathan Sadler
(74) *Attorney, Agent, or Firm* — Griffiths & Seaton PLLC

(57) ABSTRACT

The population of data to be admitted into secondary data storage cache of a data storage system is controlled by determining heat metrics of data of the data storage system. If candidate data is submitted for admission into the secondary cache, data is selected to tentatively be evicted from the secondary cache; candidate data provided to the secondary data storage cache is rejected if its heat metric is less than the heat metric of the tentatively evicted data; and candidate data submitted for admission to the secondary data storage cache is admitted if its heat metric is equal to or greater than the heat metric of the tentatively evicted data.

9 Claims, 4 Drawing Sheets

(56) References Cited

U.S. PATENT DOCUMENTS

| | | | | |
|---|---|---|---|---|
| 2008/0114930 | A1* | 5/2008 | Sanvido et al. | 711/113 |
| 2008/0235457 | A1* | 9/2008 | Hasenplaugh et al. | 711/130 |
| 2008/0235468 | A1 | 9/2008 | Chen et al. | |
| 2009/0204765 | A1* | 8/2009 | Gupta | G06F 12/121 711/133 |
| 2010/0030970 | A1* | 2/2010 | Qureshi | 711/128 |
| 2010/0095049 | A1 | 4/2010 | Manning | |
| 2010/0191916 | A1* | 7/2010 | Balakrishnan et al. | 711/134 |
| 2010/0205368 | A1 | 8/2010 | Gregg et al. | |
| 2011/0238908 | A1* | 9/2011 | Kurita | 711/113 |
| 2012/0124291 | A1* | 5/2012 | Achilles et al. | 711/122 |
| 2012/0254550 | A1* | 10/2012 | Gaur | G06F 12/0888 711/138 |
| 2012/0331019 | A1* | 12/2012 | Schreter | G06F 12/123 707/813 |
| 2013/0111131 | A1* | 5/2013 | Benhase et al. | 711/118 |
| 2013/0111133 | A1* | 5/2013 | Benhase et al. | 711/122 |

OTHER PUBLICATIONS

Jalminger et al. "A cache block reuse prediction scheme." May 2004. Elsevier. Microprocessors and Microsystems. vol. 28. pp. 373-385.*

Qureshi et al. "A Case for MLP-Aware Cache Replacement." Jun. 2006. IEEE. ISCA '06.*

Dybdahl et al. "An LRU-based Replacement Algorithm Augmented with Frequency of Access in Shared Chip-Multiprocessor Caches." Sep. 2006. ACM. MEDEA '06. ACM SIGARCH Computer Architecture News. vol. 35. pp. 45-52.*

Qureshi et al. "Adaptive Insertion Policies for High Performance Caching." Jun. 2007. ACM. ISCA '07. pp. 381-391.*

Basu et al. "Scavenger: A New Last Level Cache Architecture with Global Block Priority." Dec. 2007. IEEE. MICRO '07.*

VMware. "Large Page Performance." 2008. VMWare. http://www.vmware.com/files/pdf/large_pg_performance.pdf.*

Xiang et al. "Less Reused Filter: Improving L2 Cache Performance via Filtering Less Reused Lines." Jun. 2009. ACM. ICS '09. pp. 68-79.*

Gao et al. "A Dueling Segmented LRU Replacement Algorithm with Adaptive Bypassing." Jun. 2010. http://hal.archives-ouvertes.fr/docs/00/49/29/65/PDF/005_gao.pdf.*

Duong et al. "SCORE: A Score-Based Memory Cache Replacement Policy." Jun. 2010. http://www.jilp.org/jwac-1/online/papers/004_duong.pdf.*

Gaur et al. "Bypass and Insertion Algorithms for Exclusive Last-level Caches." Jun. 2011. ACM. ISCA '11. pp. 81-92.*

Effelsberg et al. "Principles of Database Buffer Management." Dec. 1984. ACM. ACM Transactions on Database Systems. vol. 9. pp. 560-595.*

Lee et al. "LRFU: A Spectrum of Policies that Subsumes the Least Recently Used and Least Frequently Used Policies." Dec. 2001. IEEE. IEEE Transactions on Computers. vol. 50. pp. 1352-1361.*

Feng Chen et al., "SmartSaver: Turning Flash Drive into a Disk Energy Saver for Mobile Computers," ACM, ISLPED'06, Tegernsee, Germany, Oct. 4-6, 2006.

Taeho Kgil et al., "FlashCache: A NAND Flash Memory File Cache for Low Power Web Servers," ACM, CASES'06, Seoul, Korea, pp. 103-112, Oct. 23-25, 2006.

Weikem et al., "Towards Self-Tuning Memory Management for Data Servers," Bulletin of the IEEE Computer Society Technical Committee on Data Engineering, IEEE, Jan. 1999 (9 pages).

Zong et al., "Heat-Based Dynamic Data Caching: A Load Balancing Strategy for Energy-Efficient Parallel Storage Systems with Buffer Disks," IEEE, MSST, May 2011 (6 pages).

* cited by examiner

SELECTIVE POPULATION OF SECONDARY CACHE EMPLOYING HEAT METRICS

FIELD OF THE INVENTION

This invention relates to computer-implemented data storage caches, and more particularly to caches having multiple levels.

BACKGROUND OF THE INVENTION

Computer-implemented data storage systems typically comprise various types of data storage in which data is stored on behalf of host computer systems. Storage controls or controllers control access to data storage media and memories in response to read and write requests. The storage controls may direct the data in accordance with data storage devices such as cache, non-volatile storage, RAID (redundant array of independent disks), JBOD (just a bunch of disks), etc. arranged into various redundancy, access speed and security levels.

As an example, an International Business Machines Corp. (IBM®) ESS (Enterprise Storage Server) such as a DS8000™ has redundant clusters of computer entities, cache, non-volatile storage, etc., called "central electronics complexes" or "CECs".

Within a data storage system, a cache comprises a fast memory or storage device used to store data or instructions that were accessed recently, are accessed frequently, or are likely to be accessed in the near future. Data stored in cache can be accessed quickly instead of being fetched or recomputed, saving both time and resources.

Cache can be provided in multiple levels. For example, a cache data storage system may comprise both a "first" or "primary" cache and a "secondary" cache. Typically, the first cache has faster access and is more costly per unit of data than a secondary cache, and the secondary cache has greater storage capacity than the first cache. For example, a first cache comprises dynamic random access memory (DRAM), while the secondary cache comprises flash memory solid-state drives such as "Flash_Cache" (TM International Business Corp.). When accessing data, a computing system or device may first look for data in the first cache and, if the data is not present there, look for the data in the secondary cache. When writing data, a computing system or device may write data to the first cache. If data in the first cache is not accessed promptly or frequently, this data may be demoted to the secondary cache. If data is not accessed promptly or frequently from the secondary cache, it may be evicted to slower access speed data storage such as RAID, JBOD, etc.

Typically, a LRU (least recently used) algorithm is employed to select which data to demote to the next lower level.

SUMMARY OF THE INVENTION

Methods, computer-implemented cache data storage systems, and computer program products are provided for controlling population of data into secondary data storage cache. "Secondary" in this context is any level of data storage cache between a first level of data storage cache and a data storage system. Thus, in a tri-level data storage cache, "secondary" data storage cache may be the second level or the third level.

In one embodiment of a computer-implemented cache data storage system comprising a secondary data storage cache, the following is performed when data is provided as a candidate to be inserted in the secondary cache:

determining heat metrics of data of the data storage system;

selecting data to tentatively be evicted from the secondary cache;

comparing the heat metric of candidate data submitted for admission to the secondary cache to the heat metric of the tentatively evicted data;

rejecting candidate data provided to the secondary data storage cache whose heat metric is less than the heat metric of the tentatively evicted data; and admitting to the secondary data storage cache, candidate data provided to the secondary data storage cache whose heat metric is equal to or greater than the heat metric of the tentatively evicted data.

In a further embodiment, the cache data storage system additionally comprises a first data storage cache and data storage; and wherein the heat metrics are based on heat of the data while the data was stored in any of the first data storage cache, the secondary data storage cache and the data storage, of the data storage system.

In another embodiment, the tentatively evicted data is determined with an LRU algorithm, and the heat metric of the tentatively evicted data is based on heat metrics of a plurality of data at an LRU end of the LRU algorithm.

In a further embodiment, the data comprise pages of data; and the heat metrics are determined by counting hits for the data on a per page basis.

In a still further embodiment, the data comprise pages of data; and the heat metrics are determined by counting hits to extents comprising multiple pages.

In another embodiment, the heat metrics are of data of an accessed data list, and in the method, reference to the data is inserted into the accessed data list as it is hit, unless the reference already exists in the accessed data list; the heat metrics are determined for the data of the accessed data list; and a cold heat metric is assumed for data not in the accessed data list.

In a further embodiment, the data comprise pages of data, and each reference of the accessed data list is a reference to a page of data, and the method additionally maintains a pointer to a page of data for each reference.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
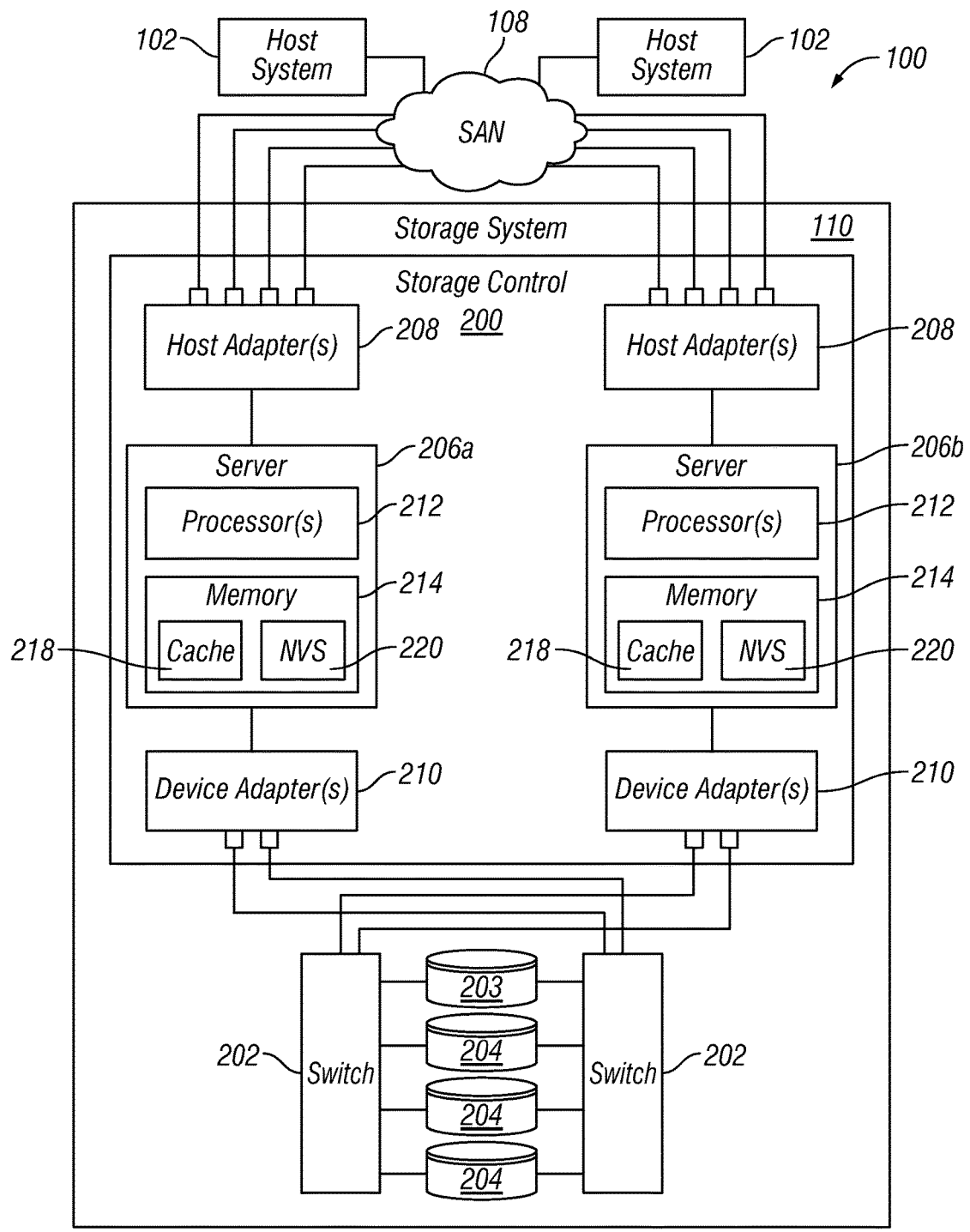
FIG. 1 is a block diagram of an exemplary network and computer-implemented storage server system in which the present invention may be implemented.

Referring to FIG. 1, an example of computer-based network architecture 100 is illustrated with a computer-implemented data storage system 110 which may implement a computer-implemented cache data storage system and methods discussed herein. The architecture 100 is presented only by way of example and is not intended to be limiting. The computer-implemented cache data storage system and methods disclosed herein may be applicable to a wide variety of different computers, servers, data storage systems, and network architectures.

The exemplary network architecture 100 may comprise one or more host computer systems 102 coupled to a network, such as a storage area network (SAN) 108. The network 108 may comprise any suitable private or public interconnection using any suitable protocol.

The storage system 110 comprises a storage control 200 configured to transfer data to and from and to control the operation of switches 202 and data storage 203 and 204. The data storage may comprise, for example, arrays of solid-state drives and hard disk drives accessible via switches 202. Alternatively or additionally, the data storage 203 and 204 may comprise individual devices or may comprise data storage libraries with many devices. All or any of the host systems 102 may direct and utilize the storage system 110 and utilize the storage control 200 and data caching system herein.

The caching system may be implemented within a storage control 200 and may also be applicable to other storage systems. As shown, the storage control 200 comprises one or more servers 206. The control 200 may also comprise host adapters 208 and device adapters 210 to provide the interfaces to connect the control 200 to host systems 102 and data storage 203 and 204, respectively. Multiple servers 206a, 206b may provide redundancy to ensure that data is always available to connected hosts 102. Thus, should one server 206a fail, the other server 206b may remain functional to ensure that data transfer is able to continue between the host systems 102 and the data storage 203 and 204. This process may be referred to as "failover".

One example of a storage system 110 having an architecture similar to that illustrated in FIG. 1 is the DS8000™ Enterprise Storage Server of International Business Machines Corp. (IBM®). The DS8000™ is a high performance, high capacity storage control providing data storage that is designed to support continuous operations and implement virtualization of data storage, and is presented herein only by way of embodiment examples and is not intended to be limiting. Thus, the caching system discussed herein is not limited to the DS8000™, but may be implemented in any comparable storage control 200 having caching, regardless of the manufacturer, product name, or components or component names associated with the system 110.

In the example of FIG. 1, each server 206 may comprise one or more computer processors 212 and memory 214. The computer processors 212 may comprise internal processing and storage capabilities to store software modules that run on the processors and, inter alia, are used to access data in the data storage 203 and 204.

In one embodiment, the memory 214 may comprise a cache 218. Whenever a host 102 accesses data from the storage system 110, for example in a read operation, the server 206 that performs the operation, for example reading data from storage 203 and 204, may save the data in its cache 218 in the event is may be required again. If the data is accessed again by a host 102, the server 206 may fetch the data from the cache 218 instead of fetching it from storage 203 and 204, saving both time and resources. Similarly, when a host system 102 performs a write, the server 206 may store, or host system 102 may direct that the data be stored, in cache 218 to be destaged to the storage 203 and 204 at a later time. When a write is stored in cache 218, the write may also be stored in non-volatile storage (NVS) 220 of the opposite server 206 so that the write can be recovered by the opposite server 206 in the event the first server 206 fails.

Figure 2:
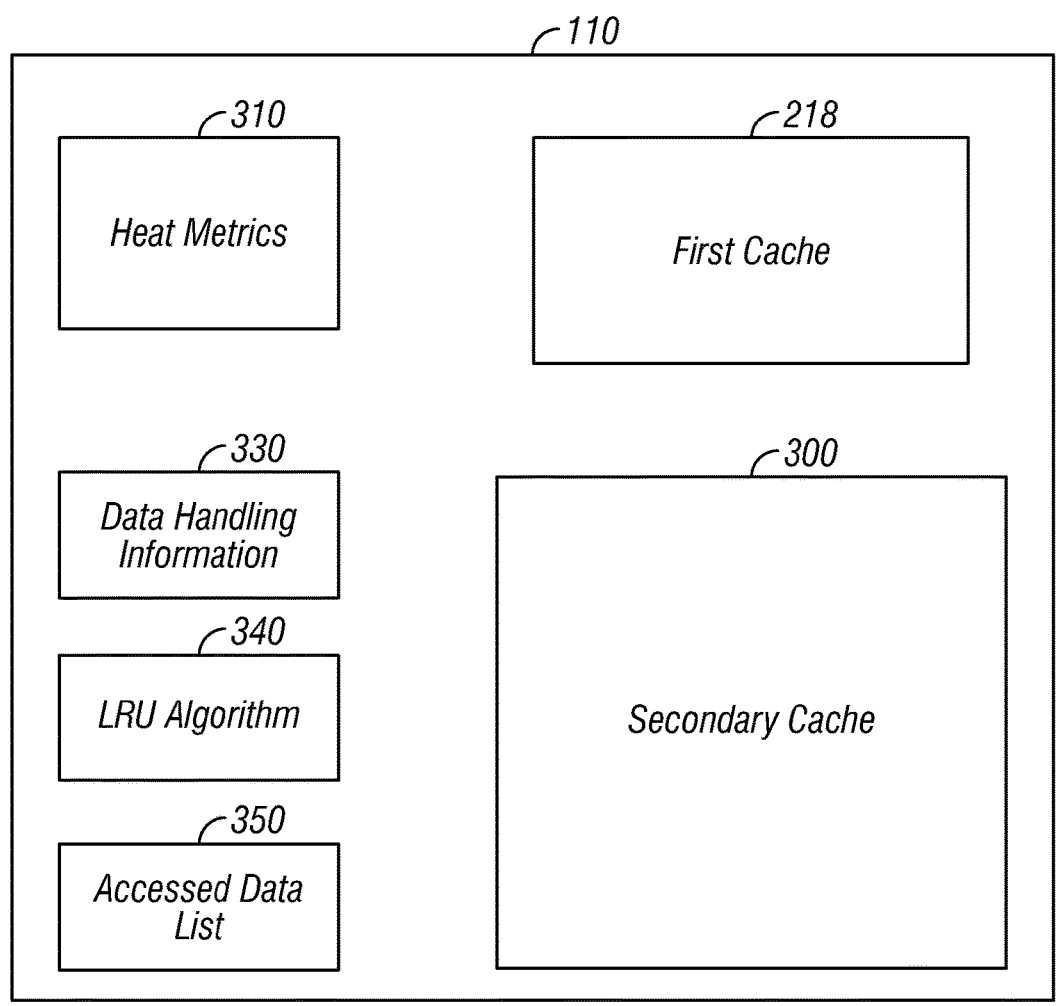
FIG. 2 is a diagrammatic illustration of a computer-implemented cache data storage system of FIG. 1.

Referring to FIGS. 1 and 2, a storage system 110 may comprise both data storage 204, such as hard disk drives, and data storage 203, such as solid state drives (SSDs) based on non-volatile memory such as flash memory. The input/output (I/O) performance of SSD drives or other types of solid state memory is typically far faster than the I/O performance of hard disk drives. Because of the higher I/O performance, the SSDs 203 may, in certain embodiments, be used to provide a large secondary cache 300 between the cache 218, serving as a first cache, and the hard disk drives 204. The use of a large secondary cache 300 may significantly improve the I/O performance of the storage system 110.

Using the secondary cache 300 if a read request is received by a server 206, the server may initially look for data in the first cache 218 and, if the data is not present, look for the data in the secondary cache 300 residing in the SSDs 203. If the data is not available in either cache, the server 206 may retrieve the data from the hard disk drives 204. Similarly, when writing or modifying data, a server 206 may initially write the data or modified data to the first cache 218. The data may eventually be destaged to the secondary cache 300 to make room in the first cache 218. This data may ultimately be destaged to the disk drives 204 to make space available in the secondary cache 300.

When data is read from hard disk drives 204, it may also be stored in the first cache 218 in case it will be accessed again.

As an example, the secondary cache 300 may be sized to provide about one to twenty percent of the total data storage capacity of the storage system 110. Thus, for a storage system 110 that comprises about 40 terabytes of data storage (from both hard disk drives 204 and SSDs 203), about 2 terabytes of this storage space may be used as a secondary cache 300. The first cache 218 is typically a small percentage of the size of the secondary cache 300. As an exemplary embodiment, the storage space for both the first cache 218 and the secondary cache 300 may be arranged in pages to provide ease of handling.

Figure 3:
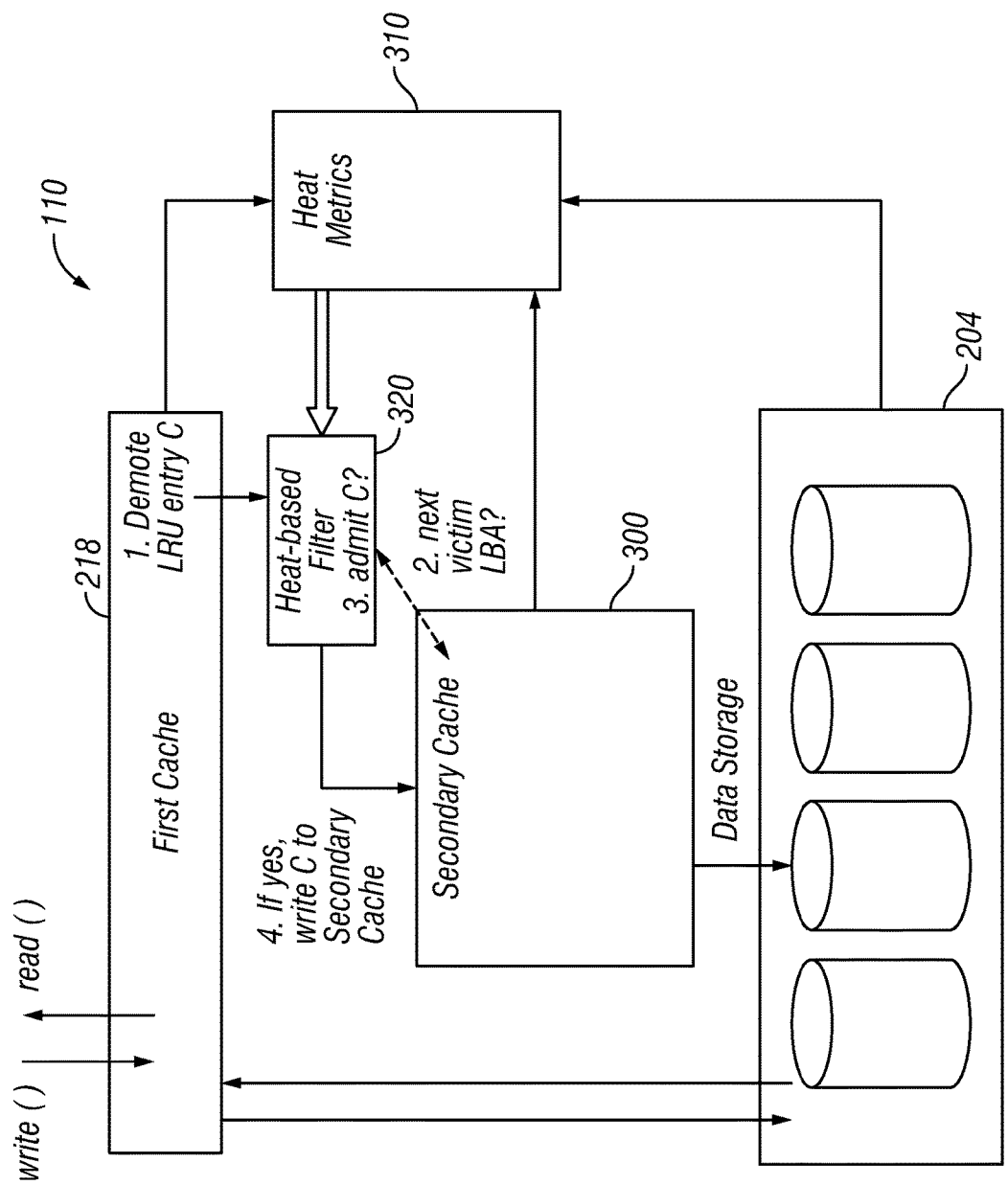
FIG. 3 is a diagrammatic illustration of various states of the system of FIGS. 1 and 2.
Figure 4:
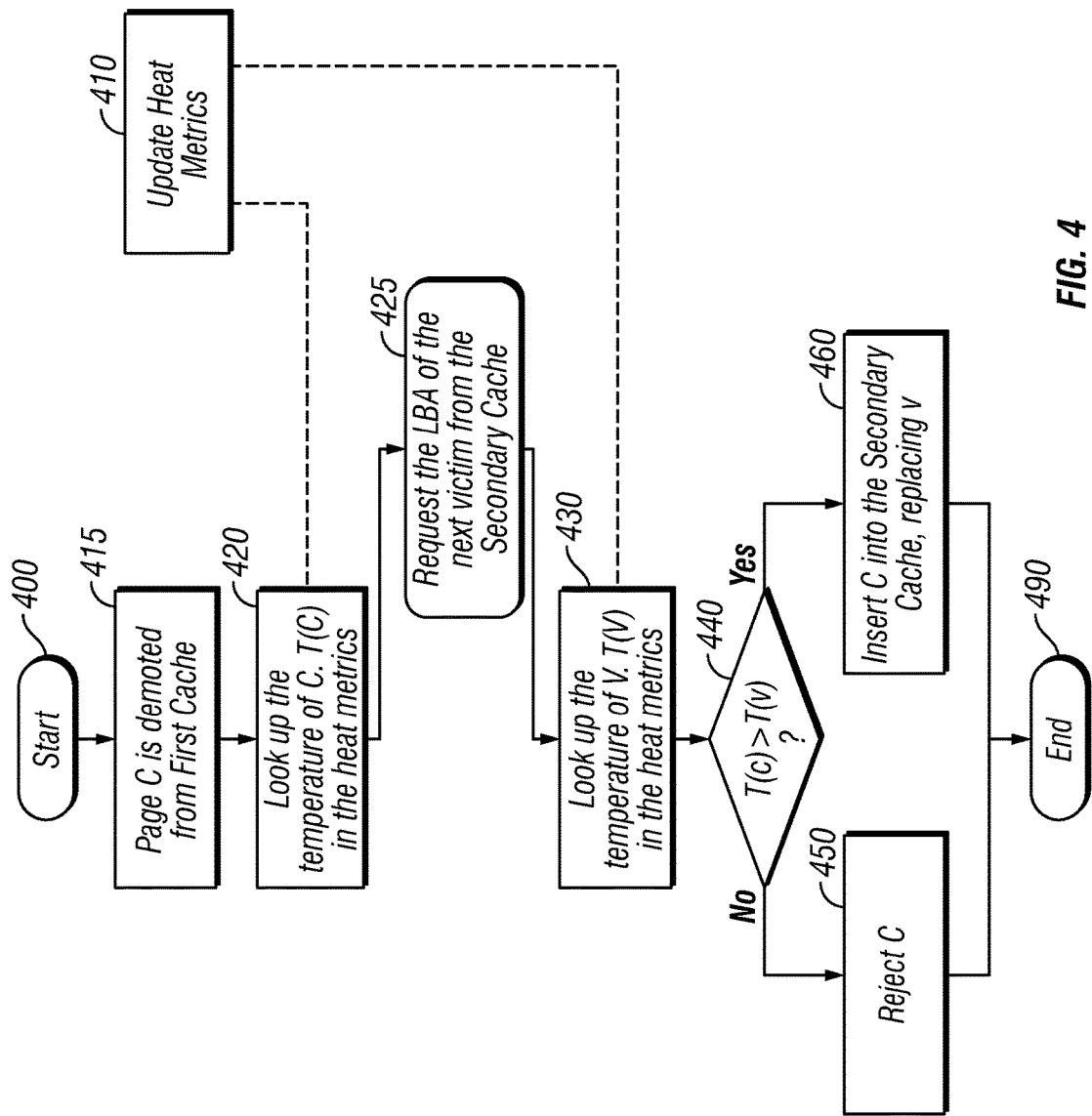
FIG. 4 is a flow chart depicting an exemplary method of operating the system of FIGS. 1 and 2.

Referring to FIGS. 2, 3 and 4, in one embodiment, heat metrics 310 are updated in step 410 and are applied to provide selective population of the secondary cache 300 from candidate data submitted to the secondary cache.

In one embodiment, heat metrics 310 are employed to filter 320 candidate data submitted for admission to the secondary cache, for example data demoted from the first cache 218. Data is selected to tentatively be evicted (victim) from the secondary cache 300, for example, identified by its logical block address (LBA). The heat metric 310 of the candidate data is compared to the heat metric of the tentatively evicted data. Candidate data provided to the secondary data storage cache is rejected if its heat metric is less than the heat metric of the tentatively evicted data; and candidate data is admitted to the secondary data storage cache 300 if its heat metric is equal to or greater than the heat metric of the tentatively evicted data.

The heat metrics 310 and statistics are maintained by the control 200 of FIG. 1 as is the operation of the filter 320. In one embodiment, the heat metrics are maintained for all of the data in the data storage system 110, comprising any of the first data storage cache 218, the secondary data storage cache 300 and the data storage 204, of the data storage system. Alternatively, the heat metrics are maintained for data stored in the caches 218 and 300.

One example of a heat metric is a count of the number of times that the page of data has been accessed ("hit") since it was last stored within the data storage system. For example, data may be located in data storage 204 and be read by a host system and stored additionally in the first cache 218. Alternatively, the data may most recently have been stored in secondary cache 300 and in data storage 204. Still alternatively, data may be stored only in data storage 204. Still further, newly written data may be stored in one of the caches, pending movement into data storage 204. The number of hits can be implemented in the form of a counter in the metadata entry for each page, for example. The metadata may be maintained as data handling information 330.

Other examples of heat metrics comprise a number of hits of a page over a limited period of time. The heat metrics may alternatively comprise a ratio of hits to a page compared to an average of hits to all pages.

Still further, the heat metrics may be aged, giving less weight or no weight to hits that are not recent. For example, the aging may be linear or exponential.

In one embodiment, the tentatively evicted data of the secondary cache 300 is determined by control 200 of FIG. 1 with an LRU (least recently used) algorithm 340, and the control bases the heat metric 310, 410 of the tentatively evicted data on heat metrics of a plurality of data, such as a selected number of pages of data, that are at an LRU end of the LRU algorithm. Various LRU algorithms are known to those of skill in the art and are directed to determining the data that has not been hit either recently or often, or a combination. The heat metric 310, 410 may comprise the average heat metric of the pages in the LRU end.

Still referring to FIGS. 2, 3 and 4, in one embodiment, the data comprise pages of data; and the heat metrics 310, 410 are determined by counting hits for the heat metric on a per page basis.

Alternatively, the data comprise pages of data and the heat metrics are determined by counting hits to extents comprising multiple pages. The heat metrics may be determined based on one or more of the pages within an extent using existing metadata 330, but it is implicitly assumed that all the consecutive pages of the extent have the same heat metric. As the result, the footprint of the metadata required to track the heat metric for an extent is lessened depending on the size of the extents.

In another embodiment, the heat metrics 310, 410 are of data of an accessed data list 350 independent of the caches 218, 300, such as a ghost list. A reference to the data is inserted into the accessed data list as it is hit, unless the reference already exists in the accessed data list; the heat metrics are determined for the data of the accessed data list, and a cold heat metric, for example of "0", is assumed for data not in the accessed data list. The accessed data list 350 may comprise the MRU (most recently used) end of a MRU algorithm. Various MRU algorithms are known to those of skill in the art and are directed to determining the data that has been hit either recently or often, or a combination. The size of the ghost list is several times the size of the secondary cache, and reduces the footprint of the metadata required to track the heat metric for the storage system 110. The heat metric 310, 410 may comprise the average heat metric of the pages in the MRU end.

In one embodiment, wherein the data comprise pages of data, and each reference of the accessed data list is a reference to a page of data, a pointer to the page of data is maintained for each reference.

Still referring to FIGS. 2, 3 and 4, the selective population of data into secondary data storage cache 300 begins at step 400 when, in step 415, a candidate page is provided. In one embodiment, the candidate page C is demoted from the first cache 218, for example by a LRU algorithm for the first cache maintained by the storage control 200 of FIG. 1.

In step 420, the control looks up the heat metric temperature of the candidate page C "T(C)" in the heat metrics 310, wherein the heat metric has been previously determined 410, above. As discussed above, the heat metric may not be for the specific candidate page, but may comprise the heat metric for an extent, or may comprise the heat metric of a plurality of data, such as a selected number of pages of data, that are at an LRU end of the LRU algorithm. The control may employ a pointer to look up the heat metric.

In step 425, the control selects the data to tentatively be evicted from the secondary cache, for example by using the LRU algorithm for the secondary cache 300. The data to tentatively be evicted from the secondary cache may also be called a "victim" V. The data tentatively to be evicted may, for example, be identified by its address, such as a LBA (logical block address).

In step 430, the control looks up the heat metric temperature of the victim page V "T(V)" tentatively to be evicted from the secondary cache in the heat metrics 310, wherein the heat metric has been previously determined 410, above. As discussed above, the heat metric may not be for the specific victim page, but may comprise the heat metric of a plurality of data, such as a selected number of pages of data, that are at an LRU end of the LRU algorithm. The control may employ a pointer to look up the heat metric.

In step 440, the control compares the heat metric 310 T(C) of the candidate data C submitted to the secondary cache 300, to the heat metric 310 T(V) of the tentatively evicted data V.

The control, in step 450, rejects candidate data C submitted for admission to the secondary data storage cache 300 whose heat metric T(C) is less than the heat metric T(V) of the tentatively evicted data V; and, in step 460, admits to the secondary data storage cache 300, candidate data C submitted for admission to the secondary data storage cache whose heat metric T(C) is equal to or greater than the heat metric T(V) of the tentatively evicted data V. Step 490 looks for the next candidate page.

In a data storage system 110 that tracks the heat metrics of the data for other purposes, and that uses some mechanism such as an LRU list to identify the data to be demoted from the first storage 218, the additional code required herein is to expose the identification of the data as a candidate C and to look up the heat metric for the candidate and for the victim V.

A person of ordinary skill in the art will appreciate that the embodiments of the present invention, disclosed herein, including the computer-implemented storage control 200 for controlling the population of data into the secondary data storage cache 300 of the storage system 110 of FIG. 1, and the functionality provided therein, may be embodied as a system, method or computer program product. Accordingly, embodiments of the present invention may take the form of an entirely hardware embodiment, an entirely software embodiment (including firmware, resident software, microcode, etc.) or a combination thereof, such as an embodiment combining software and hardware aspects that may all generally be referred to herein as a "circuit," "module" or "system." Furthermore, embodiments of the present invention may take the form of a computer program product embodied in one or more non-transitory computer readable medium(s) having computer readable program code embodied thereon.

Any combination of one or more, non-transitory computer readable media may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Those of skill in the art will understand that changes may be made with respect to the methods discussed above, including changes to the ordering of the steps. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A computer program product for populating data into a secondary data storage cache of a computer-implemented cache data storage system, said computer program product comprising computer-usable storage medium having non-transitory computer-usable program code embodied therein, said computer-usable program code comprising:

computer-usable program code to determine heat metrics of data of said data storage system, said heat metrics considering an age of said data such that a predetermined weight is assessed corresponding to a number of hits linearly aged over a time period, wherein no weight is assessed to hits which occurred less recently than a certain timeframe within the time period;

computer-usable program code to select a plurality of data to tentatively be evicted from said secondary cache, said plurality of data selected with an LRU (least recently used) algorithm and comprising a plurality of data at an LRU end of said LRU algorithm;

computer-usable program code to determine a heat metric of said tentatively evicted plurality of data at said LRU end of said LRU algorithm;

computer-usable program code to compare said heat metric of candidate data submitted from a first data storage cache for admission to said secondary cache, to said heat metric of said tentatively evicted data;

computer-usable program code to reject candidate data provided from said first data storage cache to said secondary data storage cache whose heat metric is less than said heat metric of said tentatively evicted data such that said hits to said candidate data from said first data storage cache are compared to said hits to said tentatively evicted data and said candidate data is rejected from admission to said secondary data storage cache if said hits of said candidate data are lower than said hits of said tentatively evicted data; and computer-usable program code to insert into said secondary data storage cache, candidate data provided from said first data storage cache to said secondary data storage cache whose heat metric is equal to or greater than said heat metric of said tentatively evicted data such that said candidate data is admitted to said secondary data storage cache, when upon performing the comparison, said hits of said candidate data are equal to or higher than said hits of said tentatively evicted data;

wherein said data comprise pages of data; said heat metrics are determined by counting said hits to extents comprising multiple pages; and said heat metric of said tentatively evicted plurality of data is based on an average of heat metrics of said plurality of data at said LRU end of said LRU algorithm; and wherein said heat metrics are of data of an accessed data list; and said computer-usable program code additionally:

inserts a reference to data into said accessed data list as it is hit, unless said reference already exists in said accessed data list;

determines said heat metrics of said data of said accessed data list; and assumes a cold heat metric for data not in said accessed data list.

2. The computer program product of claim 1, wherein said cache data storage system additionally comprises data storage; and wherein said heat metrics are based on heat of said data while said data was stored in any of said first data storage cache, said secondary data storage cache and said data storage, of said data storage system.

3. The computer program product of claim 1, wherein each reference of said accessed data list is a reference to a page of data, and wherein said computer-usable program code additionally maintains a pointer to said page of data for each reference.

4. A method for populating data into a secondary data storage cache of a computer-implemented data storage system, comprising:

determining heat metrics of data of said data storage system, said heat metrics considering an age of said data such that a predetermined weight is assessed corresponding to a number of hits linearly aged over a time period, wherein no weight is assessed to hits which occurred less recently than a certain timeframe within the time period;

selecting a plurality of data to tentatively be evicted from said secondary cache, said plurality of data selected with an LRU (least recently used) algorithm and comprising a plurality of data at an LRU end of said LRU algorithm;

determining a heat metric of said tentatively evicted plurality of data at said LRU end of said LRU algorithm;

comparing said heat metric of candidate data submitted from a first data storage cache for admission to said secondary cache, to said heat metric of said tentatively evicted data;

rejecting candidate data provided from said first data storage cache to said secondary data storage cache whose heat metric is less than said heat metric of said tentatively evicted data such that said hits to said candidate data from said first data storage cache are compared to said hits to said tentatively evicted data and said candidate data is rejected from admission to said secondary data storage cache if said hits of said candidate data are lower than said hits of said tentatively evicted data; and inserting into said secondary data storage cache, candidate data provided from said first data storage cache to said secondary data storage cache whose heat metric is equal to or greater than said heat metric of said tentatively evicted data such that said candidate data is admitted to said secondary data storage cache, when upon performing the comparison, said hits of said candidate data are equal to or higher than said hits of said tentatively evicted data;

wherein said data comprise pages of data; said heat metrics are determined by counting said hits to extents comprising multiple pages; and said heat metric of said tentatively evicted plurality of data is based on an average of heat metrics of said plurality of data at said LRU end of said LRU algorithm; and wherein said heat metrics are of data of an accessed data list; and said method additionally comprises: inserting a reference to data into said accessed data list as it is hit, unless said reference already exists in said accessed data list; determining said heat metrics of said data of said accessed data list, and assuming a cold heat metric for data not in said accessed data list.

5. The method of claim 4, wherein said cache data storage system additionally comprises data storage; and wherein said heat metrics are based on heat of said data while said data was stored in any of said first data storage cache, said secondary data storage cache and said data storage, of said data storage system.

6. The method of claim 4, wherein each reference of said accessed data list is a reference to a page of data, and additionally comprises maintaining a pointer to said page of data for each reference.

7. A computer-implemented cache data storage system comprising:

a first data storage cache;

a secondary data storage cache; and a control for populating data into said secondary data storage cache, said control:

determining heat metrics of data of said data storage system, said heat metrics considering an age of said data such that a predetermined weight is assessed corresponding to a number of hits linearly aged over a time period, wherein no weight is assessed to hits which occurred less recently than a certain timeframe within the time period;

selecting a plurality of data to tentatively be evicted from said secondary cache, said plurality of data selected with an LRU (least recently used) algorithm and comprising a plurality of data at an LRU end of said LRU algorithm;

determining a heat metric of said tentatively evicted plurality of data at said LRU end of said LRU algorithm;

comparing said heat metric of candidate data submitted from said first data storage cache for admission to said secondary cache, to said heat metric of said tentatively evicted data;

rejecting candidate data provided from said first data storage cache to said secondary data storage cache whose heat metric is less than said heat metric of said tentatively evicted data such that said hits to said candidate data from said first data storage cache are compared to said hits to said tentatively evicted data and said candidate data is rejected from admission to said secondary data storage cache if said hits of said candidate data are lower than said hits of said tentatively evicted data; and inserting into said secondary data storage cache, candidate data provided from said first data storage cache to said secondary data storage cache whose heat metric is equal to or greater than said heat metric of said tentatively evicted data such that said candidate data is admitted to said secondary data storage cache, when upon performing the comparison, said hits of said candidate data are equal to or higher than said hits of said tentatively evicted data;

wherein said data comprise pages of data; said heat metrics are determined by counting said hits to extents comprising multiple pages; and said heat metric of said tentatively evicted plurality of data is based on an average of heat metrics of said plurality of data at said LRU end of said LRU algorithm; and wherein said heat metrics are of data of an accessed data list; and said control additionally: inserts a reference to data into said accessed data list as it is hit, unless said reference already exists in said accessed data list; determines said heat metrics of said data of said accessed data list, and assumes a cold heat metric for data not in said accessed data list.

8. The computer-implemented cache data storage system of claim 7, additionally comprising:

data storage; and wherein said heat metrics are based on heat of said data while said data was stored in any of said first data storage cache, said secondary data storage cache and said data storage.

9. The computer-implemented cache data storage system of claim 7, wherein said control maintains each reference of said accessed data list as a reference to a page of data, and additionally maintains a pointer to said page of data for each reference.

* * * * *